Oct. 18, 1966 D. VON SANDEN ETAL 3,280,263

SWITCHING ARRANGEMENT FOR A TIME-DIVISION MULTIPLEX TELEPHONE SYSTEM

Filed March 29, 1963 2 Sheets-Sheet 1

United States Patent Office 3,280,263
Patented Oct. 18, 1966

3,280,263

SWITCHING ARRANGEMENT FOR A TIME-DIVISION MULTIPLEX TELEPHONE SYSTEM

Dieter von Sanden, Munich-Solln, and Max Schlichte and Hans Doerfler, Munich, Germany, assignors to Siemens & Halske Aktiengesellschaft, Berlin and Munich, Germany, a corporation of Germany Filed Mar. 29, 1963, Ser. No. 269,205
Claims priority, application Germany, Apr. 2, 1962, S 78,784
4 Claims. (Cl. 179—15)

Figure 1:
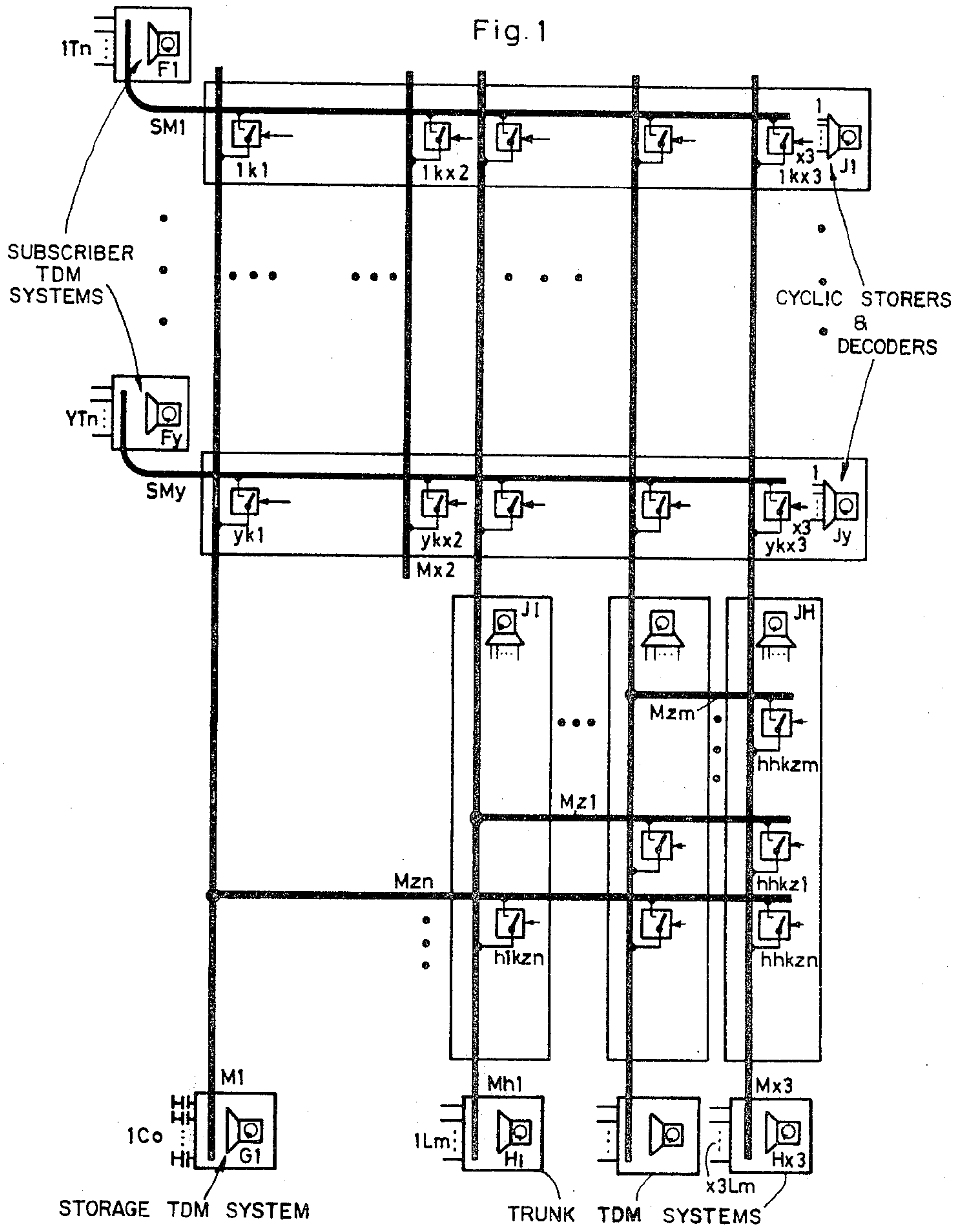

The invention disclosed herein is concerned with an improved switching arrangement for a time-division multiplex telephone system which is patricularly applicable to a system such as described in the copending application Serial No. 205,404, filed June 26, 1962, which is owned by the same assignee named in the present case.

The copending application relates to a switching arrangement over which is conducted the traffic of a plurality of time-division multiplex telephone communication systems, each of which comprises a telephone multiplex line common for outgoing and incoming traffic to which the subscribers of the telephone system in question are connected periodically in impulse-wise fashion by means of speech or call switches. This switching arrangement is developed as a coupling multiple also referred to as a cross-wire multiple, to the row or line conductors of which are individually connected the telephone multiplex lines so that via its column conductors can be effected both, the traffic between the different time-division multiplex telephone communication systems, by pulse-wise closing of coupling point contacts which produce connections between respective row conductors, and also the traffic within the time-division multiplex telephone communication systems, namely by pulse-wise closing of coupling point contacts which produce connections to time-division multiplex communication systems having their multiplex lines connected to special column lines, said time-division multiplex communication systems having, instead of subscribers, speech energy storers which can be connected twice each cycle to their multiplex line so that in all of these types of operation, only one speech switch need be actuated in the systems at the same time, since the speech energy storers bridge over the time intervals between the times of the closing of the speech switches associated with the different subscribers, for the exchange of energy between said subscribers. In the copending application, there has already been indicated a supplementation of this switching arrangement, in accordance with which there are connected to special column conductors multiplex lines of additional time-division multiplex communication systems to which there are connected, instead of subscribers, trunk lines leading to other central exchanges for outgoing and/or incoming traffic, for the handling of which the coupling point contacts leading to said column conductors are closed in pulse-like fashion. After this supplementing of the switching arrangement, traffic can be handled within and between the individual systems of a central exchange which contains the coupling switching arrangement, and also traffic between the subscribers of the systems of the exchange in question and other exchanges over lines connected with the latter. In this manner, normally, all desired connections within and between said central exchanges can be produced.

It may, however, be desirable under certain circumstances to have still further possibilities of connection, so that lines which are connected to a special system of such a central exchange and which lead to other central exchanges or the like, can be connected not only with subscribers of systems of the central exchange in question, but also with other such trunk lines which lead to other central exchanges or the like, and which are also connected to a separate system of the central exchange in question. This can for instance be the case when all regular connecting paths between two outside central exchanges are occupied while idle lines still extend from both outside exchanges to the central exchange which contains the coupling switching arrangement described in the copending application. The invention described below now makes it possible to establish in one such case via said exchange, i.e., via its coupling switching arrangement over which the traffic in and between the time-division multiplex telephone communication systems of the exchange in question is conducted, an indirect connection between the two outside exchanges.

The present invention thus relates to a switching arrangement via which is conducted the traffic of a plurality of time-division multiplex telephone communication systems each having a telephone multiplex line to which the subscribers of the corresponding system are connected in pulse-wise manner periodically, by means of speech or call switches, which switching arrangement is in accordance with the copending application constructed as a coupling multiple, to the row conductors of which the telephone multiplex lines are individually connected, so that over its column conductors can be extended both the traffic between the different time-division multiplex telephone communication systems, by pulse-wise closing of the coupling point contacts which produce connections between the row conductors entering into question in each case, and also the traffic within the individual time-division multiplex telephone communication systems, by pulse-wise closing of the coupling point contacts which produce connections with systems which have speech energy storers instead of subscribers and are connected via their multiplex lines to special column conductors, and in connection with which there are connected to special column conductors multiplex lines of systems to which are connected, instead of subscribers, trunk lines for outgoing and incoming traffic leading to other central exchanges. The particular features of this switching arrangement reside in that the coupling multiple contains additional coupling point contacts associated in each case with a combination pair of the special column conductors to which the multiplex lines of the additional time-division multiplex communication systems are connected which have trunk lines leading to other central exchanges instead of to subscribers, over which coupling point contacts, traffic between the additional systems can be conducted by pulse-wise closing of the coupling point contacts connected to the multiplex lines entering in each case into consideration. At the same time, there can also be provided coupling point contacts which in each case are associated with a combination pair of a separate column conductors to which is connected the multiplex line of a system with trunk lines leading to other central exchanges, and with a column conductor to which is connected the multiplex line of a separate system having speech energy storers instead of subscribers, over which coupling point contacts the traffic can be conducted within the additional systems with trunk lines leading to other central exchanges.

The switching arrangement in accordance with the invention is advantageous, particularly in cases in which there are provided in a central exchange only a relatively small number of such additional time-division multiplex communication systems to which there are connected, instead of subscribers, trunk lines for outgoing and incoming traffic leading to other central exchanges or the like, in connection with which, however, the traffic between said additional may be relatively heavy. For conducting this traffic between the additional systems having trunk lines leading to other exchanges, there then need be used, according to the invention, only a relatively small number of coupling points; however, despite this, and insofar as only two time-division multiplex communication systems to be connected through have a common free-pulse phase, a free coupling point over which the desired connection can be produced is definitely available. The relatively small number of coupling points naturally also results in a correspondingly reduced expenditure for control means for governing these coupling points; in addition, the expenditure for control means is maintained small, due to the fact that for such connections between the additional systems having trunk lines leading to other central exchanges or the like, only one coupling point need be actuated in each case in the switching arrangement according to the invention.

The invention will now be explained in further detail with reference to the accompanying drawings.

FIG. 1 shows essential parts of the switching arrangement also shown in FIG. 3 of the copending application, and further parts provided according to the present invention; and FIGS. 2*a* to 2*d* show different arrangements of coupling point contacts.

FIG. 1 shows essential parts of the switching arrangement also shown in FIG. 3 of the copending application, so that the fundamental construction of this switching arrangement can be noted herefrom. This switching arrangement is developed as a coupling multiple also referred to as cross wire multiple. The coupling point contacts are arranged at crossing points of rows and columns; they are connected in multiples, row-wise and column-wise. Thus, for example, the contacts 1*k*1 . . . 1*kx*3 are arranged in one row of the coupling multiple and are connected with one terminal each to the corresponding row conductor. With their other terminals, they are connected individually to different column conductors which perpendicularly intersect said row conductor. The contacts 1*kx*2 . . . *ykx*2 lying along a column are connected in similar manner with one terminal in each case jointly to the corresponding column conductor M*x*2 and their other terminals individually to different row conductors perpendicularly intersecting said column conductors. By closing a coupling point contact, two intersecting lines can be connected with each other. To the row conductors, there are connected the telephone multiplex lines SM1 . . . SM*y* of time-division multiplex telephone communication systems F1 . . . F*y*. To these systems, there are connected groups of subscribers 1T*n* . . . YT*n* for which the telephone traffic is to be handled by the switching arrangement described in the copending application. To a few column conductors of the coupling multiple, there are connected with their multiplex lines M1 . . . time-division multiplex communication systems G1 . . . which, instead of subscribers, have speech energy storers 1C*o* . . . . By means of these systems G1 . . . , traffic can be conducted between the individual systems F1 . . . F*y* for which, in the manner described in the copending application, the coupling point contact 1*k*1 . . . *yk*1 . . . which connects the corresponding row conductor to the corresponding column conductor is closed periodically in pulse-like fashion for two different pulse phases. Further column conductors . . . M*x*2, to which no special devices are connected, serve for handling the traffic between the systems F1 . . . F*y*, two coupling point contacts connected to the same column conductor being closed in each case so that two row conductors are connected with each other via said column conductor. Finally, there are connected to special column conductors the multiplex lines of the time-division multiplex communication systems H1 . . . H*x*3 which, instead of subscribers, have trunk lines leading to other central exchanges or the like, for the extension of outgoing and incoming traffic. These lines are combined into line groups 1L*m* . . . *x*3L*m*. Upon the handling of this traffic between one such trunk line leading to another central exchange or the like, and a subscriber of one of the systems F1 . . . F*y*, there is closed in each case a coupling point contact which connects the respective column conductor with the corresponding row conductor and thus the multiplex lines connected at the time periodically in pulse-like fashion with each other. Since in the accompanying FIG. 1, the designations of the individual switching parts are the same as the designations used in the copending application, it is deemed unnecessary to explain in further detail the parts of the switching arrangement inasmuch as the copending application may be consulted for such details.

In accordance with the invention, there are provided additional coupling point contacts, including coupling point contacts which, like for instance the coupling point contact *hhkzl*, are connected in each case to two of the special column conductors to which are connected the multiplex lines M*h*1 . . . M*x*3 of the additional time-division multiplex communication systems H1 . . . H*x*3 having lines 1L*m* . . . *x*3L*m* for outgoing and incoming traffic leading to other central exchanges. With each combination pair of the special column conductors and thus with each combination pair of such multiplex lines M*h*1 . . . M*x*3 connected thereto, there is associated in this manner a coupling point; for example, the coupling point contact *hhkzl* is associated with those special column conductors to which the multiplex line M*h*1 of the system H1 or the multiplex line M*x*3 of the system H*x*3 is connected. In addition, there are provided coupling point contacts which, as for instance the coupling point contact *hlkzn*, are connected in each case to two column conductors to one of which is connected the multiplex line M*h*1 . . . M*x*3 of such an additional system H1 . . . H*x*3 having lines 1L*m* . . . *x*3L*m* leading to other central exchanges, and to the other of which is connected the multiplex line M1 . . . of a special time-division multiplex communication system G1 . . . having speech energy storers 1C*o* . . . . Each coupling point contact *hlkzn* . . . *hhkzn* . . . is associated in this manner with a combination pair consisting of a column conductor to which is connected the multiplex line of a time-division multiplex communication system having trunk lines leading to other central exchanges or the like, and of a column conductor to which is connected the multiplex line of a time-division multiplex communication system having speech energy storers.

The handling of the traffic within and between the additional time-division multiplex systems H1 . . . H*x*3 having trunk lines leading to other central exchanges or the like is effected in the following manner:

If, for instance, a connection is to be made between a line of the trunk line group 1L*m* of the system H1 and a line of the trunk line group *x*3L*m* of the system H*x*3, the speech switch—already mentioned in the copending application—of the corresponding line is closed periodically in pulse-like fashion, in the system H1 so that said line is connected periodically with the multiplex line M*h*1 of the system H1. The control pulse causing this manner of closing has a specific phase relationship which differs from the phase relationships of control pulses associated with other lines of the same communication system H1. Synchronously with the actuation of the speech switch associated with the said line, the coupling point contact *hhkzl* is also periodically closed in pulse-like manner. There is in this way produced a connection between the two special column conductors to which are connected the multiplex lines M*h*1 and M*x*3 and thus also a corresponding connection between the two multiplex lines M*h*1 and M*x*3. The desired telephone connection is produced by cycling the address of the desired line from the line group *x*3L*m*, in the cyclic storer—already mentioned in the copending application—of the time-division multiplex communication system H*x*3, in such a manner that the resultant control pulse for the speech switch in the system H*x*3 leading to said second line has the same phase relationship as the control pulse which controls the speech switch associated with the first line in the system H1. In order to maintain this connection, therefore, only one cyclic storer is required in each of the corresponding time-division multiplex communication systems.

Between two specific systems H1 . . . H$x$3 having trunk lines leading to other central exchanges or the like, a plurality of telephone connections can, of course, also exist simultaneously. The corresponding control pulses must then, however, have different phase relationships. These telephone connections can then be conducted over the same coupling point contact without their interfering with each other. Trunk lines which belong to other pairs of systems H1 . . . H$x$3 can simultaneously be connected with each other, since other coupling point contacts are to be actuated for this purpose. There can also simultaneously exist telephone connections which are maintained by means of control pulses of the same phase relationship. It is then merely necessary to satisfy the condition that they are extended over different multiplex lines M$h$1 . . . M$x$3.

The traffic between trunk lines of one and the same system H1 . . . H$x$3 having trunk lines leading to other central exchanges or the like, can also be handled by means of the above-mentioned cyclic storer which is provided in each case in such a communication system. For this purpose can also be used the special systems G1 . . . which can be reaced over the additional coupling point contacts *hlkzn* . . . *hhkzn* . . ., and which have speech energy storers 1C$o$ . . . instead of subscribers. For one and the same telephone connection there are required in this connection in each case two control pulses of different phase relationship. If for instance two trunk lines of the time-division multiplex communication system H1 are to be connected with each other, then addresses of these two trunk lines of the trunk line group 1L$m$ are cycled, staggered with respect to each other, in the cyclic storer. Therefore, both trunk lines are connected periodically in pulse-wise fashion, but at different times, to the multiplex line M$h$1 via the corresponding speech switch. In order to produce the desired connection, both times the coupling point contact *hlkzn* is periodically closed in pulse-wise fashion so that the multiplex line M$h$1 of the system H1 is connected with the multiplex line M1 of the system G1, via said coupling point contact and the two column conductors to which is connected the coupling point contact *hlkzn*. In the cyclic storer of the system G1, the address is cycled twice for the same speech energy storer and specifically, in such a manner that there are provided for the closing of the corresponding speech switch, two control pulses which are of the same phase as the two control pulses supplied for this connection in the system H1. The speaking energy storer used now bridges over, in the manner described already in the copending application, the time intervals which lie in each case between two closings of the speech switches associated with the corresponding trunk lines of the line group 1L$m$ in the system H1, so that the intended connection is produced between the two trunk lines of the corresponding system.

At the same time, still other pairs of trunk lines of the same line group 1L$m$ of the system H1 can be connected to each other without interference, by means of other speech energy storers of the system G1, since other control pulses are necessarily used for this. Insofar as other pairs of control pulses are used, pairs of trunk lines belonging to other systems (for instance H$x$3) can also in addition be connected with each other, specifically even if speech energy storers 1C$o$ belonging to the system G1 are used. These connections are then naturally conducted over other coupling point contacts, for instance over the coupling point contact *hhkzn*. As indicated in FIG. 1, there can be made via other coupling point contacts, connections to other column conductors to which multiplex lines of systems having speech energy storers are connected, and it is therefore possible to connect with each other trunk lines, the speech switches of which are controlled by means of control pulses which have the same phase relationship as those already used for another connection. These telephone connections are, however, to be conducted over other column conductors in order to avoid mutual interference. This results automatically since for instance the same pair of control pulses can be delivered in one and the same time-division multiplex communication system having speech energy storers only for one speech energy storer, since in each case only one cyclic storer is provided there.

Some information will now be given as to how the coupling point contacts which are additionally provided can be actuated. These coupling point contacts can be actuated with the same means as provided, in the manner already described in the copending application, for the actuation of the speech switches in the time-division multiplex communication systems. Thus, for example, special cyclic storers can be provided in which are cycled as addresses, code signals associated with the coupling point contacts and which serve to produce control pulses. These control pulses then effect the periodic pulse-wise closing of the corresponding coupling point contacts. Such cyclic storers can for instance be associated in each case with the additional coupling point contacts connected to a special column conductor. There are in this manner associated with the coupling point contacts, devices designated J1 . . . JH which contain in each case a cyclic storer having a decoder and other parts (not shown). The cyclic storer with decoder belonging to the device JH has for instance as many outputs as there are additional coupling point contacts *hhkzm* . . . *hhkzl, hhkzn* . . . connected in accordance with the invention to the special column conductor leading to the multiplex line M$x$3 of the system H$x$3. These coupling point contacts may be actuated via these outputs. More than one additional coupling point contact connected to a special column conductor need not be actuated simultaneously since different telephone connections would in such case be connected together; accordingly, for the actuation of the additional coupling point contacts connected to a given special column conductor, one cyclic storer is in each case sufficient. The cyclic storer belonging to the device J1 is associated in similar manner with coupling point contacts which are connected to the special column conductor connected with the multiplex line M$h$1 of the system H1, the coupling point contacts which, like for instance the coupling point contact *hhkzl,* are connected to two separate column conductors and have been taken into consideration already by a device (for instance JH), there being therefore no need for further consideration thereof. It is also possible to control the coupling point contacts in another combination by cyclic storers, for instance by a number of cyclic storers which is equal to the number of connections that can be made simultaneously in a given pulse phase relationship, in which case each cyclic storer must be able to control each of the coupling contact points.

In conclusion, it may also be mentioned that the coupling point contacts which are contained in the switching arrangement shown in FIG. 1, of course, do not need to consist in each case of a simple mechanical or electronic contact but that they can be constructed, depending on the type of technique employed, as two-wire or four-wire contacts. In case of a four-wire coupling point contact arrangement, it is necessary of course to comply with the condition that in the connections conducted over such coupling point contacts, between two time-division multiplex communication systems, each having a four-wire multiplex line, the speech multiplex line of one system is connected with the receiving multiplex line of the other system, and conversely the speech multiplex line of the other system is connected with the receiving multiplex line of the first system. This will be explained briefly with reference to FIG. 2$a$ to 2$d$ in which different possibilities for the coupling point contacts are shown in a single-wire representation.

Figure 2A:
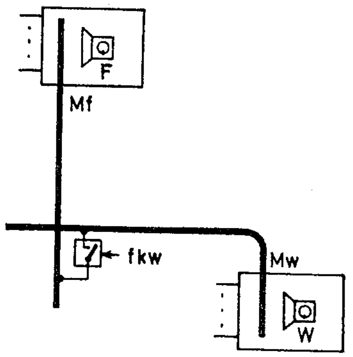

In FIG. 2*a*, there is shown a two-wire coupling point contact *fkw* which interconnects two crossing two-wire multiplex lines M*f* and M*w* of two time-division multiplex communication systems F and W having trunk lines leading to subscribers or to other central exchanges or the like.

Figure 2B:
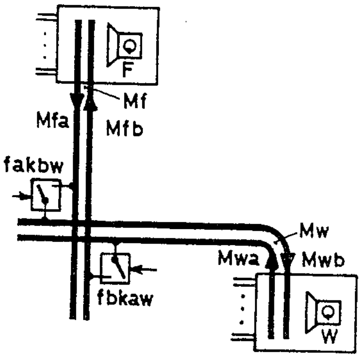

Accordingly, if there are concerned two crossing four-wire multiplex lines of two such time-division multiplex communication systems, the coupling point will be constructed in accordance with FIG. 2*b*. At the crossing point of the two four-wire multiplex lines, there is provided here a duo-group of coupling point contacts *fakbw* and *fbkaw* of which the coupling point contact *fakbw* connects the speech multiplex line M*fa* of the system F with the receiving multiplex line M*wb* of the system W, while the coupling point *fbkaw* connects the speech multiplex line M*wa* of the system W with the receiving multiplex line M*fb* of the system F.

Figure 2C:
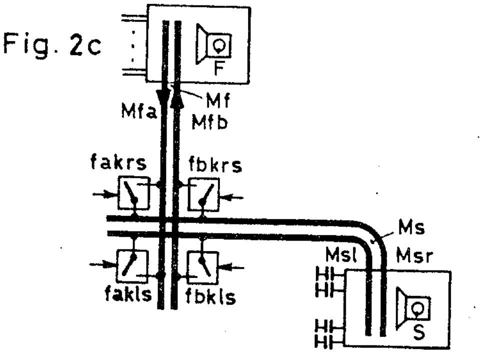

If the four-wire multiplex line M*f* of a time system F having lines leading to subscribers or other central exchanges or the like, and the four-wire multiplex line M*s* of a system S which has speech energy storers instead of subscribers, which are connected two times per scanning period to their multiplex line M*s* cross each other, then the coupling point, in accordance with FIG. 2*c*, has a quad group of contacts *fakls, fbkls, fbkrs, fakrs,* one of which, at one of the two instants, is closed at one diagonally lying pair of coupling point contacts, and at the other instant at the other diagonally lying pair of contacts. The result is thus again obtained that the speech energy transmitted at the one instant from the one subscriber of the system F over the speech multiplex line M*fa* and, for instance, the coupling point contact *fakls,* to the speech energy storer of a pair of speech energy storers, which is connected to the line M*s*1, is transmitted at the other instant from said speech energy storer, again connected to the line M*s*1, now over the coupling point contact *fbkls* and the receiving multiplex line M*fb* to the other subscriber of this connection within the system F, and vice versa.

Figure 2D:
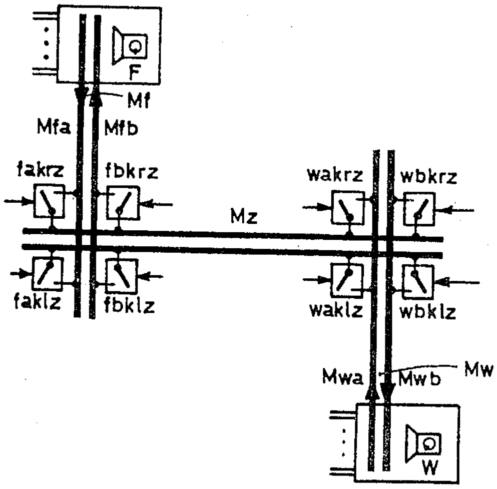

In similar manner, a coupling point has a quad group of contacts when the four-wire multiplex lines M*f* and M*w* of the systems F and W which are to be connected with each other, do not cross each other, but rather the connections are made via a special four-wire multiplex line Mz which crosses the two four-wire multiplex lines M*f* and M*w,* which are to be connected together. Such coupling points are shown in FIG. 2*d*. In this case, upon establishing a connection, two diagonally opposite contacts are always closed at the two coupling points, the two coupling point contacts lying on one diagonal, for instance, the coupling point contacts *fakrz* and *fbklz* being closed at one coupling point, and at the other coupling point, the two coupling point contacts lying on the other diagonal, for instance, the coupling point contacts *wbkrz* and *waklz* are closed, thus again connecting the speech multiplex line M*fa* of the system F with the receiving multiplex line M*wb* of the system W and, conversely, the speech multiplex line M*wa* of the other system W with the receiving multiplex line M*fb* of the first system F.

Changes may be made within the scope and spirit of the appended claims which define what is believed to be new and desired to have protected by Letters Patent.

We claim:

1. In a switching arrangement, over which is conducted the traffic of a plurality of time-division multiplex telephone communication systems, each having a telephone multiplex line to which the subscribers of the corresponding system are periodically connected in pulse-wise fashion in each case by means of speech switches, said arrangement being constructed as a coupling or cross-wire multiple to the row conductors of which are individually connected the telephone multiplex lines so that via its column conductors, there can be conducted the traffic between the different time-division multiplex telephone communication systems, by pulse-wise closure of coupling point contacts which effect connections between involved row conductors, as well as the traffic within the individual time-division multiplex telephone communication systems, likewise by pulse-wise closure of coupling point contacts which are adapted to produce connections with time-division multiplex telephone communication systems having speech energy storers instead of subscribers, which are connected via their multiplex lines to special column conductors, and wherein multiplex lines of time-division multiplex communication systems having lines for outgoing and incoming traffic leading to other central exchanges are connected to special column conductors; the improvement which comprises, disposed in said coupling multiple, additional coupling point contacts associated with a combination pair of the special column conductors to which are connected the multiplex lines of the additional time-division multiplex communication systems having lines leading to other exchanges, via which additional coupling point contacts traffic can be effected between the additional time-division multiplex communication systems, by pulse-wise closure of the additional coupling point contacts which are connected to specific multiplex lines involved in connections which are to be established.

2. A switching arrangement according to claim 1, comprising further additional coupling point contacts per combination pair of a special column conductor to which is connected the multiplex line of a time-division multiplex communication system having lines leading to other exchanges and of a column conductor to which is connected the multiplex line of a special time-division multiplex communication system having speech energy storers, via which further additional coupling point contacts traffic can be conducted within the additional time-division multiplex communication systems having lines leading to other central exchanges.

3. A switching arrangement according to claim 2, wherein additional coupling point contacts which are connected to the same multiplex line are actuated by means of code signals serving as addresses and being periodically cycled in a cycling storer, coupling point contacts which are connected to two multiplex lines being thereby only once operatively considered.

4. A switching arrangement according to claim 3, wherein different coupling point contacts which are connected to the same multiplex line are not actuated simultaneously.

References Cited by the Examiner

UNITED STATES PATENTS 3,204,033 8/1965 Adelaar ------------- 179—15

DAVID G. REDINBAUGH, *Primary Examiner.*

R. L. GRIFFIN, *Assistant Examiner.*